United States Patent Office 3,368,743
Patented Feb. 13, 1968

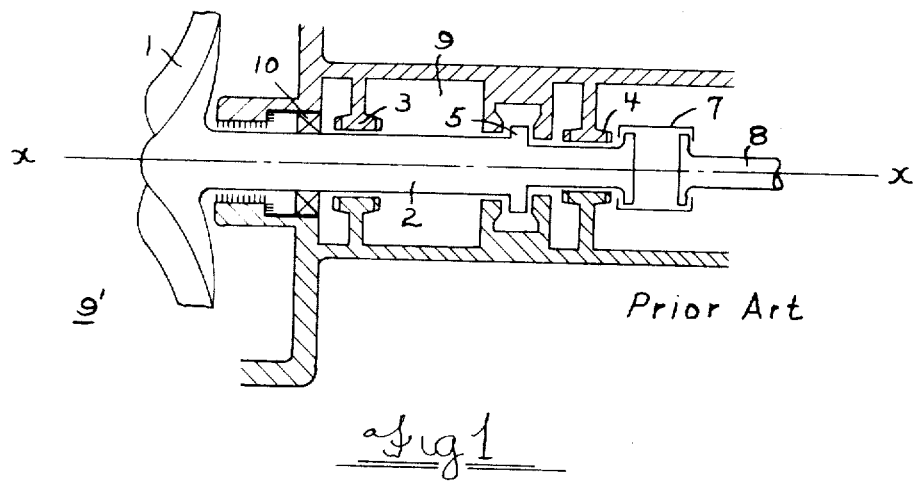
*Fig 1* — Prior Art
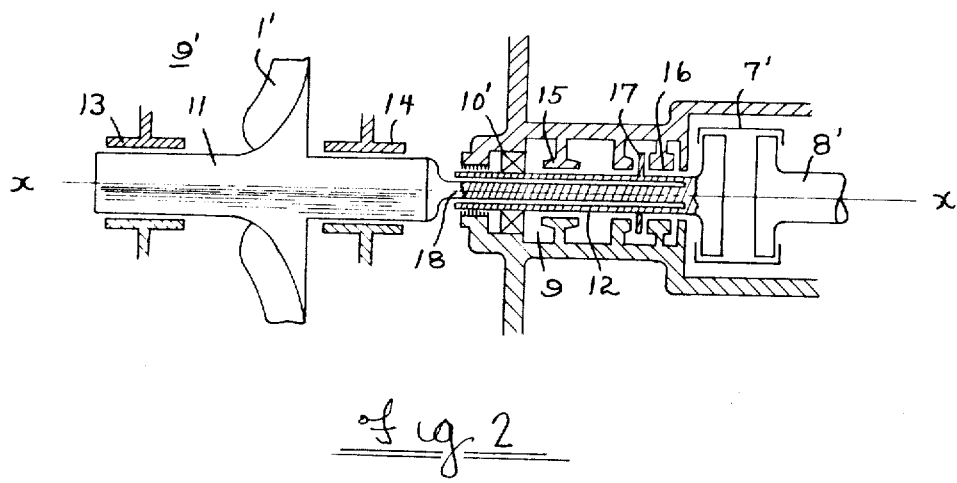
*Fig 2*

3,368,743
SHAFT CONSTRUCTION FOR ROTARY MACHINES
Jean Chaboseau, Boissy-St-Leger, France, assignor to Campagnie Electro-Mecanique, Paris, France, a body corporate of France
Filed Apr. 7, 1966, Ser. No. 540,883
Claims priority, application France, Apr. 12, 1965, 12,843, Patent 1,440,721
7 Claims. (Cl. 230—132)

ABSTRACT OF THE DISCLOSURE

A housing enclosing a gas to be circulated by an impeller located within the same includes an opening in the housing wall through which the impeller shafting extends to the outside for connection to a prime mover. The shafting is composed of three parts functionally united together, the two outer shaft parts being relatively rigid and the intermediate shaft part being relatively flexible. One of the rigid shaft parts which mounts the impeller is located within the housing and supported on axially spaced bearings therein. The other rigid shaft part is located outside of the housing and also supported on axially spaced bearings and is connected to the prime mover by a coupling. The intermediate, relatively flexible shaft part serves to absorb a substantial amount of such dynamic and thermal stresses as may be transmitted from the impeller shaft part to the other rigid shaft part thus relieving and stabilizing the latter of such stresses. This last mentioned rigid shaft part contacts the gas seal at the shaft pass-through opening in the housing wall and being so stabilized minimizes the chances for gas leakage at the seal from the interior of the housing to the outside.

---

The present invention relates to shaft construction for rotary machines and more particularly to an improved shaft construction for mounting the motor driven impeller element of a pump, fan, or similar machine used to move a fluid in a closed circuit which is required to be isolated from the atmosphere. Such machines must incorporate a sealing device between the bladed impeller and the atmosphere. Depending upon the nature and state of the fluid to be circulated and the rotary speed of the machine, a satisfactory seal structure can be extremely difficult to fabricate.

When the circulating fluid can also be used as a lubricant for the bearings which support the impeller shaft one solution to the problem of sealing consists in immersing the entire machine, including its bearings, in the circulating fluid, the necessary sealing structure as between the impeller and atmosphere then being placed outside of the machine on that part of the shaft to which the motor or other prime mover used for rotating the impeller is coupled, and which is mounted outside of the closed fluid circuit. One suitable arrangement of this type is disclosed in my co-pending application Ser. No. 540,737, filed Apr. 6, 1966 and entitled Multiple Impeller Blower Construction.

The present invention is an improvement upon the shafts of rotary machines used under such conditions. It is characterized principally by the fact that the rotary shaft on which the impeller is mounted is comprised of three metal shaft parts arranged along a common axis constituting the axis of shaft rotation. The shaft part at one end of the three-part shaft structure is rigid and on this is mounted the impeller of the machine which drives the fluid along its closed circuit. The shaft part at the opposite end of the three-part shaft is also rigid, and coupled to this is a motor or other prime mover for driving it. This shaft part passes through a wall of the enclosing housing and is sealed by use of a conventional stuffing box. The third shaft part and which is located intermediate the other two shaft parts and united therewith is relatively long and flexible as compared with the other two parts and is not supported by any bearings whatsoever. This intermediate shaft part due to its less rigid characteristic functions as a dynamic and thermal stress absorber or buffer between the other two shaft parts and thus effects a substantial improvement in the operating conditions of the seal as between circulating fluid and the outer atmosphere, and reducing the possibility of leakage.

The foregoing as well as other objects and advantages of the improved shaft structure will become more apparent from the following detailed description of one representative embodiment and from the accompanying drawings.

FIG. 1 of these drawings depicts, in a central longitudinal and generally sectional view the pertinent parts of an impeller and shaft structure of a rotary machine already known in the art; while FIG. 2 shows in a view similar to FIG. 1, an impeller and shaft structure of the same machine but which is constructed in accordance with the present invention.

With reference now to the drawings, and to FIG. 1 in particular, the rotor element of the machine is seen to be comprised of an impeller 1 for the fluid to be circulated mounted upon one end of a shaft 2 which is supported for rotation in longitudinally spaced journal type bearings 3 and 4. The shaft includes a thrust bearing structure 5 located intermediate the ends thereof for absorbing any axially directed forces which may occur as a result of shaft rotation. All three of these bearings, 3, 4 and 5 can be lubricated with any suitable fluid medium such as, for example, oil. A shaft coupling 7 of conventional construction is provided for connecting the opposite end of shaft 2 to the drive output shaft 8 of a prime mover such as a motor. The interior of housing 9 which encloses the shaft, its bearings and the prime mover coupling is isolated from the gaseous interior of the housing part 9', in which is located the impeller 1 for circulating the gas, by means of a gland seal 10 of conventional construction located at the pass-through point of the shaft between the housing parts 9 and 9'.

FIG. 2 shows the improved shaft construction in accordance with the present invention. The left end shaft part 11 which is rigid has mounted thereon the impeller 1', the latter being located intermediate two longitudinally spaced bearings 13, 14 both located within the casing part 9' and which are of the journal type and lubricated by the gas within the casing part 9' put into motion by the impeller 1' for flow through the closed circuit not otherwise detailed in the drawing. The right end shaft part 12 coaxial with shaft part 11 which is also rigid is located within the housing part 9 and supported by longitudinally spaced journal bearings 15, 16 and a thrust bearing 17, all three of these bearings being of the oil lubricating type. A gland seal 10' surrounds the shaft part 12 at the housing wall dividing the casing parts 9 and 9' to isolate the gas within housing part 9' from atmosphere which exists within housing part 9, and a conventionally constructed coupling 7' is provided for connecting shaft part 12 with the drive shaft 8' of the prime mover such as an electric motor, not shown.

The shaft parts 11 and 12 are interconnected by an intermediately located shaft part 18 also arranged along the axis of rotation $x$—$x$. The opposite ends of the intermediate shaft part 18 are united with the shaft parts 11 and 12 and the characteristics of this intermediate shaft part 18 are that it is long and relatively flexible as compared with the shaft parts 11 and 12 which have a much higher axial rigidity factor. Being relatively long and flexible, only a small portion of the stresses acting upon shaft part 11 and attributable to heat and vibration incurred during operation of the impeller will be transmitted through shaft part 18 to the rigid shaft part 12 thus enabling the latter to operate in an essentially stress and vibration free manner which has the major advantage of placing the all important gas seal 10' under more favorable working conditions and reducing the possibility of leakage. Because the intermediate shaft part 18 is not itself supported by any bearing structure, the improved shaft construction also permits of some tolerance in relative axial alignment as between the shaft parts 11 and 12 without imposing any inadmissible loading on their respective supporting bearing. Moreover, dynamic stresses imposed upon the shafting at coupling 7' are not reflected into the bearings 13, 14 which support shaft part 11.

Summarizing, the respective functions of the three parts of the overall shafting between impeller 1' and prime mover drive shaft 8' are as follows:

Shaft part 11 carries the impeller 1'. This shaft part is rigid and supported by gas lubricated bearings 13, 14, the lubricating gas being the gas within housing part 9' put into circulation by the impeller.

Shaft part 12 extends through the seal 10' in the housing wall separating the gas within housing part 9' from the atmosphere which prevails within housing part 9, and this shaft part can be supported by bearings of any type.

Shaft part 18 which interconnects shaft parts 11 and 12 functions as a dynamic and thermal stress absorber which minimizes transmittal of these stresses from shaft part 11 to shaft part 12 and thus minimizes forces which otherwise would tend to reduce the effectiveness of the desired seal 10' which is needed to mutually isolate the interiors of the housing parts 9 and 9'.

Various structural embodiments of the improved, three-part shafting are possible within the scope of the invention. For example, all three component parts of the composite shaft can be machined from the same forged blank. Further, two adjacent shaft parts can be machined from the same steel forging and these can then be united with the third part which is machined from a separate forging. It is also possible to machine the three parts of the shafting from separate forged shaft blanks and then to unite them to establish the composite three-part shafting. Moreover, either the shaft part 11, or part 12, or both can be hollow, and part 18 united with them at suitable points in their respective bores. Finally, shaft parts 11 and 12 can both be solid, or part 11 can be hollow and part 12 solid.

In the illustrated embodiment, the two shaft parts 12 and 18 are machined from the same forging. After final machining, the shaft part 12 is established by an outer tubular portion which receives seal 10' and bearings 15, 16 and 17, and the intermediate bearingless shaft part 18 is established by an inner solid, cylindrical portion whose diameter is slightly less than the inner diameter of the tubular shaft part 12 so as to establish a slight radial clearance between the two which permits the intermediate shaft part 18 to exercise its dynamic and thermal stress absorbing function minimizing stress transfer as between the two shaft parts 11 and 12. The intermediate shaft part 18 is united with the third shaft part 11 after machining.

I claim:

1. In a rotary machine for moving a gaseous fluid located within a housing in a manner isolated from atmosphere, the combination comprising a gas impeller positioned within said housing, a three-part shaft structure extending through an opening in a wall of said housing, said shaft structure comprising a first rigid shaft part located entirely within said housing and on which said impeller is mounted, first bearing means located within said housing and which mount said first shaft part for rotation on its axis, a second rigid shaft part arranged co-axially with said first shaft part and which extends through a seal at said wall opening which separates the gas filled interior thereof from the exterior where atmospheric conditions prevail, second bearing means located exteriorly of said housing for mounting said second shaft part for rotation on its axis, means located exteriorly of said housing for coupling said second shaft part to a prime mover output shaft, and an elongated third shaft part arranged coaxially with and located intermediate said first and second shaft parts and united therewith at its ends, said third shaft part being relatively flexible as compared with the more rigid characteristic of said bearing supported first and second shaft parts, and said third shaft part itself not having any bearing support whereby said third shaft part functions to absorb a substantial amount of such dynamic and thermal stresses as may be transmitted from said first shaft part to said second shaft part as a result of rotation of said impeller.

2. A rotary machine as defined in claim 1 for impelling a gaseous fluid within a housing wherein said first, second and third shaft parts constitute a unitary structure made from a single piece of metal.

3. A rotary machine as defined in claim 1 for impelling a gaseous fluid within a housing wherein two adjacent parts of said three-part shafting for rotating said impeller constitute a unitary structure made from a single piece of metal and the remaining shaft part is made from a separate piece of metal which is thereafter joined to said adjacent shaft parts.

4. A rotary machine as defined in claim 1 for impelling a gaseous fluid within a housing wherein said first, second and third shaft parts of said three-part shafting for rotating said impeller are formed separately from separate pieces of metal and which are thereafter joined together.

5. A rotary machine as defined in claim 1 for impelling a gaseous fluid within a housing wherein one of said first and second shaft parts of said three-part shafting for rotating said impeller is hollow, said third shaft part being solid and being inserted in said hollow shaft part and united therewith.

6. A rotary machine as defined in claim 1 for impelling a gaseous fluid within a housing wherein both of said first and second shaft parts of said three-part shafting for rotating said impeller are hollow, said third shaft part being solid and being inserted in said hollow shaft parts and united therewith.

7. A rotary machine as defined in claim 1 for impelling a gaseous fluid within a housing wherein said second shaft part of said three-part shafting for rotating said impeller includes a cylindrical tubular portion which engages said seal in said housing wall and is supported at least in part by said second bearing means and wherein said third shaft part is inserted into said tubular portion of said second shaft part and united therewith.

References Cited

UNITED STATES PATENTS

| 775,884 | 11/1904 | Buckstrom. | |
| 1,913,886 | 6/1933 | Kennedy. | |
| 2,165,448 | 7/1939 | Browne. | |
| 2,738,660 | 3/1956 | Gail. | |
| 2,809,503 | 10/1957 | Gaubatz et al. | |
| 2,042,533 | 6/1936 | Kieser | 230—116 |
| 2,419,592 | 4/1947 | Richardson | 103—111 |
| 2,732,695 | 1/1956 | Davis | 230—132 |
| 2,738,920 | 3/1956 | McDowall | 230—132 |
| 2,778,565 | 1/1957 | Atkinson | 230—132 |
| 3,070,286 | 12/1962 | Weaving | 230—132 |
| 3,105,631 | 10/1963 | Hanny | 230—116 |
| 3,134,535 | 5/1964 | Maier | 230—132 |

HENRY F. RADUAZO, *Primary Examiner.*